(12) United States Patent
Burdenski et al.

(10) Patent No.: US 7,808,225 B2
(45) Date of Patent: Oct. 5, 2010

(54) PARALLEL ARRANGED POWER SUPPLIES

(75) Inventors: Ralf Burdenski, Nuremberg (DE);
Pieter Gerrit Blanken, Eindhoven (NL);
Giuseppe Grillo, Nijmegen (NL); Derk Reefman, Eindhoven (NL)

(73) Assignee: ST-Ericsson SA, Plan-les-Ouates (CH)

( * ) Notice: Subject to any disclaimer, the term of this patent is extended or adjusted under 35 U.S.C. 154(b) by 701 days.

(21) Appl. No.: 11/547,416

(22) PCT Filed: Mar. 24, 2005

(86) PCT No.: PCT/IB2005/051020

§ 371 (c)(1),
(2), (4) Date: Sep. 28, 2006

(87) PCT Pub. No.: WO2005/096481

PCT Pub. Date: Oct. 13, 2005

(65) Prior Publication Data

US 2008/0265862 A1 Oct. 30, 2008

(30) Foreign Application Priority Data

Mar. 31, 2004 (DE) .................................. 04101326

(51) Int. Cl.
*G05F 1/445* (2006.01)
(52) U.S. Cl. .................................................... 323/350
(58) Field of Classification Search ................. 323/350, 323/272; 307/43; 330/297; 363/65
See application file for complete search history.

(56) References Cited

U.S. PATENT DOCUMENTS

| | | | | |
|---|---|---|---|---|
| 4,683,415 A | * | 7/1987 | Zimmerman | ................. 323/282 |
| 5,200,709 A | * | 4/1993 | Saito et al. | ................... 330/126 |
| 5,369,564 A | * | 11/1994 | Choi | .............................. 363/71 |
| 5,880,627 A | | 3/1999 | Thiel, V | |
| 6,043,706 A | * | 3/2000 | Nowak et al. | .................. 330/2 |
| 6,121,759 A | * | 9/2000 | Uusitalo | ...................... 323/272 |
| 6,130,526 A | * | 10/2000 | Yang et al. | ................... 323/272 |
| 6,175,273 B1 | | 1/2001 | Sigmon et al. | |
| 6,750,637 B2 | * | 6/2004 | Nagaki et al. | ................ 323/272 |
| 6,903,947 B2 | * | 6/2005 | Hermann et al. | .............. 363/69 |

(Continued)

FOREIGN PATENT DOCUMENTS

DE 3446660 A1 6/1986

(Continued)

*Primary Examiner*—Adolf Berhane
*Assistant Examiner*—Yemane Mehari
(74) *Attorney, Agent, or Firm*—Robert Iannucci; Seed IP Law Group PLLC

(57) ABSTRACT

A power supply system comprises a parallel arrangement of a first switched mode power supply (1) which has a first system bandwidth (LB 1) and a second switched mode power supply (2) which has a second system bandwidth (LB2) covering higher frequencies than the first system bandwidth (LB 1). The first switched mode power supply (1) is dimensioned to supply a first maximal output power (P1$m$), the second switched mode power supply (2) is dimensioned to supply a second maximal output power (P2$m$) being smaller than the first maximal output power (P1$m$). A control circuit (3) varies a reference voltage (Vr) of both the first switched mode power supply (1) and the second switched mode power supply (2) to obtain a corresponding variation of an output voltage (Vout) of the parallel arrangement.

19 Claims, 2 Drawing Sheets

Figure 1:
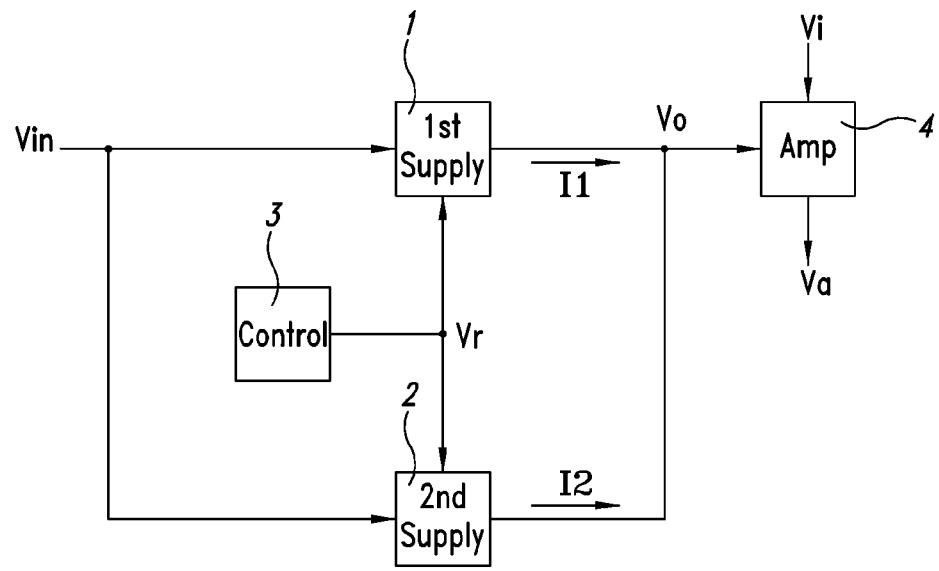

| U.S. PATENT DOCUMENTS | | | | | |
|---|---|---|---|---|---|
| 2004/0100740 A1* | 5/2004 | Iwashita ..................... 361/18 | EP | 0 476 908 | 3/1992 |
| 2004/0190314 A1* | 9/2004 | Yoshida ..................... 363/65 | WO | WO 00/48306 | 8/2000 |

FOREIGN PATENT DOCUMENTS

| EP | 0 260 776 | 3/1988 |
|---|---|---|

* cited by examiner

PARALLEL ARRANGED POWER SUPPLIES

The invention relates to a power supply system, an amplifier system comprising the power supply system and an amplifier, and a mobile apparatus comprising the power supply system and the amplifier.

WO 00/48306 discloses the control of a power amplifier output level. A variable power supply voltage is generated for this power amplifier which depends on the output level required. A combination of a switched-mode converter in series with a linear regulator generates the varying power supply voltage for the power amplifier. The switched-mode converter efficiently generates the majority of the power required by the power amplifier, and may or may not provide sufficiently fine control to define ramp portions of a desired power envelope. The linear regulator stage performs a filtering function on the output of the switched-mode converter and controls a precise power-envelope modulation during a TDMA (Time Division Multiple Access) burst.

It is an object of the invention to provide an alternative power supply system which is able to modulate its output voltage in response to a control signal at a high speed and which has a high efficiency.

A first aspect of the invention provides a power supply system as claimed in claim 1. A second aspect of the invention provides an amplifier system comprising the power supply system and an amplifier as claimed in claim 8. A third aspect of the invention provides a mobile apparatus comprising the power supply system and an amplifier as claimed in claim 9. Advantageous embodiments are defined in the dependent claims.

The power supply system in accordance with the first aspect comprises a parallel arrangement of a first switched-mode power supply and a second switched-mode power supply. The first switched-mode power supply has a first system bandwidth and is dimensioned to supply a first maximal output power. The second switched-mode power supply has a second system bandwidth which is larger than the first system bandwidth, and the second switched-mode power supply is dimensioned to supply a second maximal output power which is smaller than the first maximal output power. A control circuit controls the reference voltage of both the first switched mode power supply and the second switched-mode power supply to obtain a corresponding variation of the output voltage of the parallel arrangement. The main power can be supplied by the efficient relatively low-frequent first switched-mode power supply. The fast transitions in the output voltage are supplied by the relatively high-frequent second switched-mode power supply which is relatively small because it has to supply a relatively small power only. Thus, both switched-mode power supplies can be optimized for their task, and are able to supply a fast varying output voltage with a high efficiency.

In fact, the output frequency ranges are divided over the two switched-mode power supplies. A low system bandwidth and high efficiency switched-mode power supply takes care to supply the output voltage up to its bandwidth. A high system bandwidth switched-mode power supply takes care to supply the remaining high frequency part of the output voltage.

Preferably, this power supply system is used in combination with a power amplifier which has to supply an output signal with an amplitude which varies over time, such as during the transmission burst of wireless communication devices such as cellular telephones, pagers, wireless modems, etc. In these wireless communication devices, the output signal of the amplifier is a radio-frequent signal. The power consumption of the RF-amplifier can be minimized if its power supply voltage is varied in accordance with the power to be supplied. In such mobile applications, usually, the power contained in the high frequency range is much lower than the power contained in the low frequency range.

It has to be noted that U.S. Pat. No. 6,130,526 discloses an arrangement of a relatively slow switched-mode power supply which supplies the majority of the output power in parallel with a relatively fast linear regulator. This prior art does not disclose that two switched-mode power supplies are arranged in parallel and that these two switched-mode power supplies have to fulfill the special requirements claimed in present claim 1 to obtain the desired object. Further, this prior art is not related to a system wherein the reference voltage of the power supplies is controlled to obtain a corresponding variation of the output voltage. To the contrary, this power supply arrangement has a fixed reference voltage and intends to keep the output voltage as constant as possible.

If the switched-mode power supplies are arranged in a feedback loop configuration, the system bandwidth is the closed loop bandwidth.

In an embodiment in accordance with the invention as claimed in claim 2, the first system bandwidth covers a frequency range from zero to a first predetermined frequency, inclusive the border values. The second system bandwidth covers a frequency range from a second predetermined frequency to a third predetermined frequency. The second predetermined frequency is selected in a range starting with the value zero and ending with the first predetermined frequency. The third predetermined frequency is selected higher than the first predetermined frequency.

This selection of the system bandwidths provides a second switched-mode power supply which acts faster than the first switched-mode power supply and thus is able to supply the fast transitions of the output power. The first switched-mode power supply is made slower than the second switched-mode power supply such that it will not supply the power during these fast transitions. The first switched-mode power supply can be optimized to optimally supply the large average power. The second switched-mode power supply can be optimized to supply the small power bursts required.

In an embodiment in accordance with the invention as claimed in claim 3, the first switched-mode power supply operates at a first switching frequency and the second switched-mode power supply operates at a second switching frequency higher than the first switching frequency. Alternatively, the first switched-mode power supply operates in a first switching frequency range which has a first upper limit. The second switched-mode power supply operates in a second switching frequency range which has a second upper limit higher than the first upper limit. Again, in this manner, care is taken that a relatively slow first switched-mode power supply can be optimized to supply the large average power optimally and the second switched-mode power supply can be optimized to supply the relatively small power bursts required.

In a preferred embodiment in accordance with the invention as claimed in claim 4, the first switched mode power supply comprises: a first switch, a first inductor, and a first controller which receives the reference voltage to control the first switch to obtain a first periodical current through the first inductor. The second switched mode power supply comprises: a second switch, a second inductor, and a second controller which receives the reference voltage to control the second switch to obtain a second periodical current through the second inductor. The first periodical current and the second periodical current are supplied to a same load. Both the switched-mode power supplies may be buck converters.

In an embodiment in accordance with the invention as claimed in claim 5, the power supply system comprises a low-pass filter which low-pass filters the reference voltage supplied to the first controller to prevent the first switched-mode power supply to supply a substantial amount of power during fast transients of the reference voltage.

In an embodiment in accordance with the invention as claimed in claim 6, the power supply system comprises a high-pass or band-pass filter which filters the reference voltage supplied to the second controller to prevent the second switched-mode power supply to supply a substantial amount of power when no fast transients of the reference voltage occur.

In an embodiment in accordance with the invention as claimed in claim 7, the power supply system comprises a delay circuit which delays the reference voltage supplied to the second controller to prevent the second switched-mode power supply to supply a substantial amount of power which should be supplied by the slower first switched-mode power supply. Now, the delay occurring from a variation of the reference voltage to a reaction of the first switched-mode power supply in adapting its output current is compensated for such that the first switched-mode power supply is able to supply the power for the low frequent part of the reference voltage change.

These and other aspects of the invention are apparent from and will be elucidated with reference to the embodiments described hereinafter.

Figure 2:
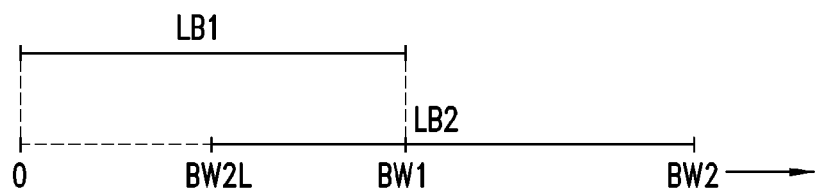
Figure 3:
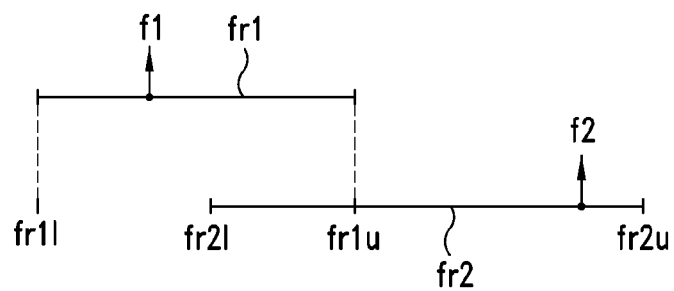
Figure 4:
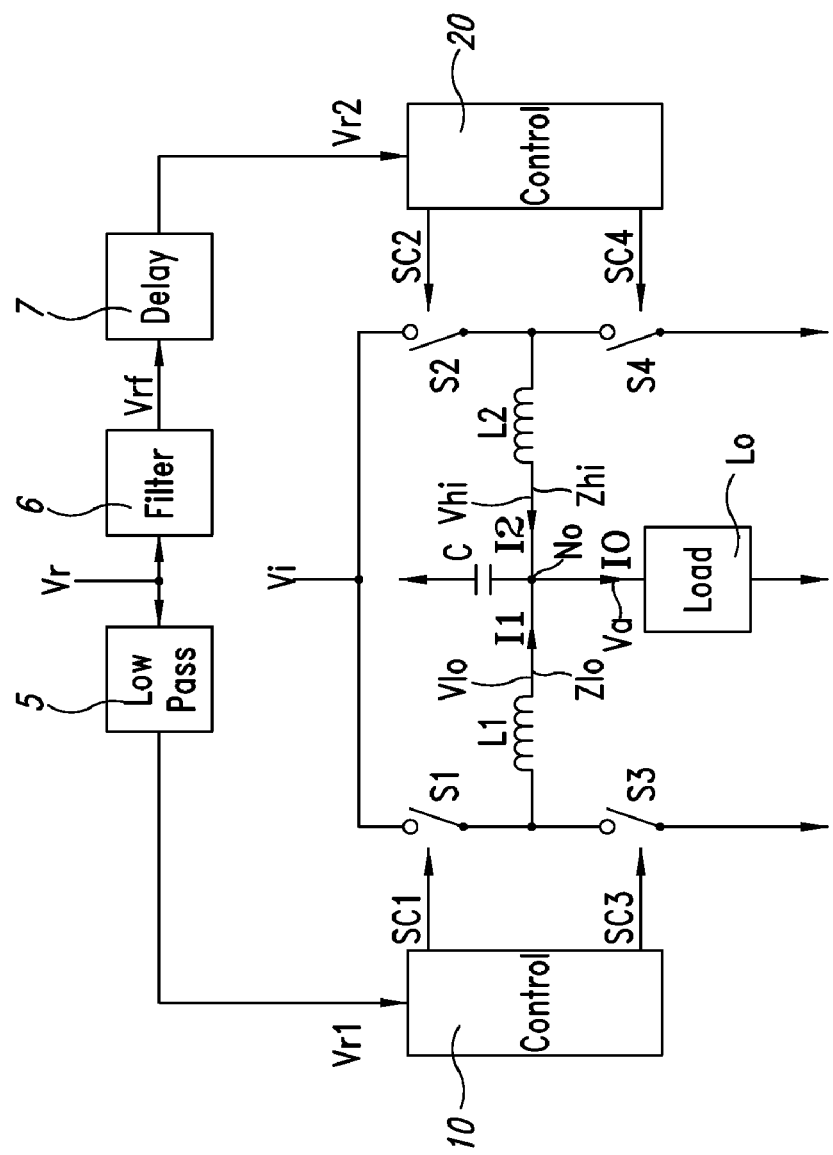

In the drawings:

FIG. 1 shows a block diagram of a parallel arrangement of two switched-mode power supplies, FIG. 2 shows an example of the selection of the system bandwidths of the two switched-mode power supplies, FIG. 3 shows an example of the selection of the operating frequencies of the two switched-mode power supplies, and FIG. 4 shows a more detailed block diagram of the parallel arrangement of the two switched-mode power supplies.

FIG. 1 shows a block diagram of a parallel arrangement of two switched-mode power supplies 1 and 2. A controller 3 supplies a reference voltage Vr. The first switched-mode power supply 1 receives an input voltage Vin and the reference voltage Vr and supplies an output current I1 to a load 4. The second switched-mode power supply 2 receives the input voltage Vin and the reference voltage Vr and supplies the output current I2 to the load 4. Both the output currents I1 and I2 are supplied to the load 4, which in this example is a power amplifier 4. The power amplifier 4 receives a power supply voltage Vo and amplifies an input signal Vi to obtain an output signal Va. Thus, both the power supplies 1 and 2 receive the same input voltage Vin and supply the same output voltage Vo and thus are arranged in parallel.

The level of reference voltage Vr determines the level of the output voltage Vo. Thus, a modulation of the reference level Vr causes a corresponding modulation of the output voltage Vo. To optimize the efficiency of the power amplifier 4, the level of the output voltage Vo is adapted continuously to optimally match the output power to be supplied by the power amplifier 4.

FIG. 2 shows an example of the selection of the system bandwidths of the two switched-mode power supplies 1 and 2. The system bandwidth LB1 of the first switched-mode power supply 1 covers the frequency range from zero to the value BW1. The system bandwidth LB2 of the second switched-mode power supply 2 covers the frequency range from the value BW2L to the value BW2. The value BW2L may be selected in the frequency range starting at zero and ending at BW1. The value BW2 is selected higher than the value BW1.

Consequently, the first switched-mode power supply 1 is able to react on slow changes of the reference voltage Vr only, while the second switched-mode power supply 2 is able to react on fast changes of the reference voltage Vr.

FIG. 3 shows an example of the selection of the operating frequencies of the two switched-mode power supplies 1 and 2. If both the first and the second switched-mode power supply 1 and 2 operate on fixed switching frequency, the switching frequency f2 of the second switched-mode power supply 2 is selected above the switching frequency f1 of the first switched-mode power supply 1. Alternatively, if both the first and the second switched-mode power supply operate with a variable frequency, the frequency range fr2 of the second switched-mode power supply 2 should at least have sub-range above the frequency range fr1 of the first switched-mode power supply 1. FIG. 3 shows a partly overlap of the frequency ranges fr1 and fr2. The first frequency range fr1 covers the frequencies fr1*l* to fr1*u* and the second frequency range fr2 covers the frequencies fr2*l* to fr2*u*. The frequency fr2*l* is higher than the frequency fr1*l* and the frequency fr2*u* is higher than the frequency fr1*u*.

FIG. 4 shows a more detailed block diagram of the parallel arrangement of two switched-mode power supplies.

The first switched-mode power supply 1 comprises a controller 10, a series arrangement of the switches S1 and S3 and an inductor L1. The series arrangement of the switches S1 and S3 is arranged between the input voltage Vin and ground. The inductor L1 is arranged between a junction of the switches S1 and S3 and an output node No to supply the current I1 to the output node No.

The second switched-mode power supply 2 comprises a controller 20, a series arrangement of the switches S2 and S4 and an inductor L2. The series arrangement of the switches S2 and S4 is arranged between the input voltage Vin and ground. The inductor L2 is arranged between a junction of the switches S2 and S4 and the output node No to supply the current I2 to the output node No.

The total current Io, of which the low-frequency content is the sum or the currents I1 and I2, is supplied to a load Lo. The voltage across the load Lo is denoted by Vo. A smoothing capacitor C is connected between the output node No and ground. The controller 10 receives a reference level Vr1 and supplies switching signals SC1 and SC3 to the switches S1 and S3, respectively. The controller 20 receives a reference level Vr2 and supplies switching signals SC2 and SC4 to the switches S2 and S4, respectively. The on-periods and the off-periods of the switches S1, S3, and S2, S4 are controlled in any well known manner based on the reference voltages Vr1 and Vr2, respectively.

Both the reference voltages Vr1 and Vr2 may be identical to the reference voltage Vr. If the switched-mode power supply 1 is bandwidth limited, only the low frequency content of the varying reference voltage Vr will be followed by the switched-mode power supply 1, and the switched-mode power supply 1 will provide the low frequent average power to the load Lo. Consequently, the switched-mode power supply 1 need not be dimensioned to follow the fast transients of the reference voltage Vr and thus can be optimally designed to supply a relatively large power with a relatively low switching frequency. If the switched-mode power supply 2 has an inherent behavior such that it does not follow slow changes of the reference voltage Vr, this switched-mode power supply 2 will not or almost not contribute to the output power of the parallel arrangement for no or slow changes of the reference voltage Vr, but will take care of the fast changes of the reference voltage Vr. Thus, the switched-mode power supply 2 can be optimized for suddenly supplying a relatively small power to the load Lo. The switched-mode power supply 2 is small and can be operated at a relatively high frequency. Both the switched-mode power supply 1 and the switched-mode power supply 2 may be buck-converters. It is commonly known how to design switched-mode power supplies which have the behavior mentioned above.

As shown in FIG. 4, the power supply system may further comprise an optional low pass filter 5 which low-pass filters the reference signal Vr to obtain the reference signal Vr1 supplied to the controller 10. The power supply system may also comprise a series arrangement of an optional filter 6 which filters the reference signal Vr to obtain a filtered reference signal Vrf. The power supply system may further comprise an optional delay circuit 7 which delays the filtered reference signal Vrf to supply the reference signal Vr2 to the controller 20. Instead of the series arrangement of the filter 6 and the delay circuit 7 it is possible to implement only the filter 6, or only the delay circuit 7.

The parallel arranged switched-mode power supplies 1 and 2 may be modeled as two voltage generators in parallel which supply a voltage Vlo and Vhi, currents I1, I2, and have an output impedance Zlo, Zhi, respectively. Preferably, the largest possible fraction of the output power supplied to the load Lo is supplied by the power supply 1. In the now following it is elucidated how the two power supplies 1 and 2 will react on a change of the reference voltage Vr. The frequencies mentioned are the frequency components of the changing reference voltage Vr.

For frequencies below the value BW1 (see FIG. 2, the upper limit of the system bandwidth of the switched-mode power supply 1), by design, the output impedance Zlo of the first switched-mode power supply 1 will be much smaller than the output impedance Zhi of the second switched-mode power supply 2, and thus the majority of the output power is supplied by the first switched-mode power supply 1. Moreover, by design, the current supplied by the second switched-mode power supply 2 may be limited to a relatively small value, and consequently the contribution of the second switched-mode power supply 2 to the output power is limited.

For frequencies in-between the value BW1 and the value BW2 (see FIG. 2, the upper limit of the system bandwidth of the switched-mode power supply 2), the output impedance Zlo on the one hand tends to increase due to the reduced system bandwidth and on the other hand tends to decrease due to the smoothing capacitor C. The value BW2L (see FIG. 2, the lower limit of the system bandwidth of the switched-mode power supply 2), is selected such that the gain of the second switched-mode power supply 2 is boosted in the frequency range BW2L to BW2, and thus the output impedance Zhi is much smaller than the output impedance Zlo. Thus, in this frequency range the output power is predominantly supplied by the second switched-mode power supply 2. The swap of the values of the output impedances Zlo and Zhi within the bandwidth BW2L to BW1 may be obtained in another manner.

The swap of the output impedance values Zhi and Zlo as function of the frequency may be obtained by using a band-pass filter 6. This band-pass filter 6 causes the switched-mode power supply 2 to predominantly supply power to the load within the band-pass of this filter 6 which preferably is the frequency range BW2L to BW2. In implementations of the switched-mode power supply 1 wherein its output impedance Zlo increases for frequencies above the value BW1 the filter 6 may be a low-pass filter. If the switched-mode power supply 2 operates as a low pass filter with bandwidth BW2, a high-pass filter with a bandwidth ranging from BW2L to infinity can substitute the band-pass filter 6. In implementations of the switched-mode power supply 1 wherein its output impedance Zlo increases for frequencies above the value BW1 and the switched-mode power supply 2 operates as a low-pass filter with bandwidth BW2, the band-pass filter 6 can be omitted.

The delay circuit 7 compensates the delay introduced in the low-frequent path from the reference voltage Vr to the output current I1 of the switched-mode power supply 1 and prevents the switched-mode power supply 2 to supply a too high amount of power to the output load Lo. First, the slower switched-mode power supply 1 should have the opportunity to supply the low-frequent part of the output power before the faster switched-mode power supply 2 has already done this, which would reduce the overall efficiency. However, although less efficient, instead of implementing the delay circuit 7, the output current I2 of the switched-mode power supply 2 may be limited.

The delay circuit 7 may be adaptive to delay variation due to non-linearity of the switched-mode power supplies 1 and/or 2.

The parallel arranged switched-mode power supplies in accordance with the invention can be used as power supply modulators for mobile applications. In these applications, the power supply modulator must have very short transition times, for example, in the order of a few microseconds for EDGE (Enhanced Data rates for GSM Evolution?), although the majority of the output power is concentrated in a much smaller bandwidth.

A large number of architectures that allow efficient and linear amplification of RF-signals is known, for example, Polar Loop, Envelope Elimination and Restoration (EER), Envelope Restoration (ER), Envelope Tracking (ET). All these architectures require a supply modulator with a high efficiency (>80%) and a large bandwidth (dependent on the application: from hundreds of kHz to tens of MHz).

It should be noted that the above-mentioned embodiments illustrate rather than limit the invention, and that those skilled in the art will be able to design many alternative embodiments without departing from the scope of the appended claims. For example, although FIG. 4 shows as switched-mode power supply which has two series arranged switches, also a switched-mode power supply with a single switch may be used.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A power supply system comprising:
    a parallel arrangement of a first switched mode power supply having a first system bandwidth and a second switched mode power supply having a second system bandwidth covering higher frequencies than the first system bandwidth, the first switched mode power supply being dimensioned to supply a first maximal output power, the second switched mode power supply being dimensioned to supply a second maximal output power that is smaller than the first maximal output power and
    a control circuit for varying a reference voltage of both the first switched mode power supply and the second switched mode power supply to obtain a corresponding variation of an output voltage of the parallel arrangement.

2. A power supply system as claimed in claim 1, wherein the first system bandwidth covers a frequency range from zero to a first frequency and the second system bandwidth covers a frequency range from a second frequency to a third predetermined frequency wherein the second frequency is within a range from zero and to the first frequency and wherein the third frequency is higher than the first frequency.

3. A power supply system as claimed in claim 1, wherein the first switched mode power supply is arranged to operate at a first frequency or in a first switching frequency range having a first upper limit and wherein the second switched mode power supply is arranged to operate at a second switching frequency that is higher than the first switching frequency or in a second switching frequency range having a second upper limit that is higher than the first upper limit.

4. A power supply system as claimed in claim 1, wherein:
the first switched mode power supply comprises a first switch, a first inductor, and a first controller for receiving the reference voltage to control the first switch to obtain a first periodical current through the first inductor:
the second switched mode power supply comprises a second switch, a second inductor, and a second controller for receiving the reference voltage to control the second switch to obtain a second periodical current through the second inductor; and
the first and second switched mode power supplies are configured to supply the first periodical current and the second periodical current to a same load.

5. A power supply system as claimed in claim 4, further comprising a low-pass filter configured to supply the reference voltage to the first controller.

6. A power supply system as claimed in claim 4, further comprising a high-pass or band-pass filter configured to supply the reference voltage to the second controller.

7. A power supply system as claimed in claim 4, further comprising a delay circuit configured to supply the reference voltage to the second controller.

8. A system as claimed in claim 4, wherein the power supply system comprises a delay circuit configured to supply the reference voltage to the second controller.

9. A system, comprising:
an amplifier having a power supply input for receiving an output voltage: and
a power supply system configured to supply the output voltage to the amplifier, the power supply system including:
a parallel arrangement of a first switched mode power supply having a first system bandwidth and a second switched mode power supply having a second system bandwidth covering higher frequencies than the first system bandwidth, the first switched mode power supply being dimensioned to supply a first maximal output power, the second switched mode power supply being dimensioned to supply a second maximal output power that is smaller than the first maximal output power and
a control circuit for varying a reference voltage of both the first switched mode power supply and the second switched mode power supply to obtain a corresponding variation of an output voltage of the parallel arrangement.

10. A system as claimed in claim 9, wherein the system is a mobile apparatus.

11. A system as claimed in claim 9, wherein:
the first switched mode power supply comprises a first switch, a first inductor, and a first controller for receiving the reference voltage to control the first switch to obtain a first periodical current through the first inductor;
the second switched mode power supply comprises a second switch, a second inductor, and a second controller for receiving the reference voltage to control the second switch to obtain a second periodical current through the second inductor; and
the first and second switched mode power supplies are configured to supply the first periodical current and the second periodical current to the amplifier.

12. A system as claimed in claim 11, wherein the power supply system comprises a low-pass filter configured to supply the reference voltage to the first controller.

13. A system as claimed in claim 11, wherein the power supply system comprises a high-pass or band-pass filter configured to supply the reference voltage to the second controller.

14. A power supply system, comprising:
a first switched mode power supply having a first system bandwidth and dimensioned to supply a first maximal output power, the first switched mode power supply including a first switch and a first inductor coupled between a first voltage terminal and an output terminal, and a first controller configured to control the first switch to obtain a first current at the output terminal through the first inductor based on a first reference voltage; and
a second switched mode power supply having a second system bandwidth covering higher frequencies than the first system bandwidth and dimensioned to supply a second maximal output power that is smaller than the first maximal output power, the second switched mode power supply including a second switch and a second inductor coupled between the first voltage terminal and the output terminal, and a second controller configured to receive a second reference voltage and control the second switch to obtain a second current at the output terminal through the second inductor based on the first reference voltage.

15. The power supply system of claim 14, wherein the first system bandwidth covers a frequency range from zero to a first frequency and the second system bandwidth covers a frequency range from a second frequency to a third frequency wherein the second frequency is within a range from zero and to the first frequency and wherein the third frequency is higher than the first frequency.

16. The power supply system of claim 14, wherein the first switched mode power supply is arranged to operate at a first frequency or in a first switching frequency range having a first upper limit and wherein the second switched mode power supply is arranged to operate at a second switching frequency that is higher than the first switching frequency or in a second switching frequency range having a second upper limit that is higher than the first upper limit.

17. The power supply system of claim 14, further comprising a low-pass filter configured to supply a second reference voltage to the first controller based on the first reference voltage.

18. The power supply system of claim 14, further comprising a high-pass or band-pass filter configured to supply a second reference voltage to the second controller based on the first reference voltage.

19. The power supply system of claim 14, further comprising a delay circuit configured to supply a second reference voltage to the second controller based on the first reference voltage.

* * * * *

UNITED STATES PATENT AND TRADEMARK OFFICE
CERTIFICATE OF CORRECTION

PATENT NO. : 7,808,225 B2  
APPLICATION NO. : 11/547416  
DATED : October 5, 2010  
INVENTOR(S) : Ralf Burdenski et al.

Page 1 of 1

It is certified that error appears in the above-identified patent and that said Letters Patent is hereby corrected as shown below:

Title page, Item 30
"Mar. 31, 2004 (DE).....04101326" should read as --Mar. 31, 2004 (EP).....04101326--.

Column 6
Claim 2, Line 59, "predetermined frequency wherein the second frequency is" should read as --frequency wherein the second frequency is--.

Column 7
Claim 4, Line 7, "a first periodical current through the first inductor:" should read as --a first periodical current through the first inductor;--.

Column 7
Claim 9, Line 30, "output voltage: and" should read as --output voltage; and--.

Signed and Sealed this
Fifth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,808,225 B2  
APPLICATION NO. : 11/547416  
DATED : October 5, 2010  
INVENTOR(S) : Burdenski et al.

Page 1 of 1

It is certified that error appears in the above-identified patent and that said Letters Patent is hereby corrected as shown below:

On the Title Page, in Item (57), under "ABSTRACT", in Column 2, Line 13, delete "(Vout)" and insert -- (Vo) --, therefor.

In the Specification

In Column 4, Line 28, delete "sum or" and insert -- sum of --, therefor.

In the Claims

In Column 7, Line 43, in Claim 9, delete "power and" and insert -- power; and --, therefor.

Signed and Sealed this  
Twenty-sixth Day of April, 2016

Michelle K. Lee  
*Director of the United States Patent and Trademark Office*